US012655918B2

(12) United States Patent
Larson et al.

(10) Patent No.: US 12,655,918 B2
(45) Date of Patent: Jun. 16, 2026

(54) ELECTRO-HYDRAULIC ACTUATOR WITH A PILOT-ACTUATED FLOAT MODE

(71) Applicant: Parker-Hannifin Corporation, Cleveland, OH (US)

(72) Inventors: Jacob S. Larson, Falcon Heights, MN (US); William Klein, Maple Grove, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 51 days.

(21) Appl. No.: 18/670,913

(22) Filed: May 22, 2024

(65) Prior Publication Data

US 2025/0003522 A1 Jan. 2, 2025

Related U.S. Application Data

(60) Provisional application No. 63/510,956, filed on Jun. 29, 2023.

(51) Int. Cl.
*F16K 31/40* (2006.01)
*F15B 1/26* (2006.01)
(Continued)

(52) U.S. Cl.
CPC .............. *F16K 31/406* (2013.01); *F15B 1/26* (2013.01); *F15B 13/027* (2013.01); *F15B 13/0401* (2013.01); *F16K 11/161* (2013.01)

(58) Field of Classification Search
CPC ......................... F15B 2211/7053; F15B 13/01
See application file for complete search history.

(56) References Cited

U.S. PATENT DOCUMENTS 3,274,902 A * 9/1966 Kleckner ................ F15B 13/01
137/596.2
3,381,587 A * 5/1968 Parquet ................... F15B 13/01
416/157 R
(Continued)

FOREIGN PATENT DOCUMENTS

EP 1450048 B1 6/2006
EP 1927759 A1 6/2008
EP 3492659 B1 5/2022

OTHER PUBLICATIONS

Book 2, Chapter 8: Directional Control Valves, Power & Motion, Sep. 23, 2008, retrieved from Internet at: https://www.powermotiontech. com/technologies/other-technologies/article/21884325/book-2-chapter-8-directional-control-valves.

*Primary Examiner* — Robert K Arundale
(74) *Attorney, Agent, or Firm* — McDonnell Boehnen Hulbert & Berghoff LLP

(57) ABSTRACT

An example hydraulic system has: a hydraulic cylinder actuator having a cylinder and a piston axially movable in the cylinder, wherein the piston has a piston head that divides an internal space of the cylinder into a first chamber and a second chamber; a fluid reservoir; a pilot pressure source that generates a pilot fluid signal; and a valve assembly controlling fluid flow to and from the hydraulic cylinder actuator, wherein the valve assembly has a first workport fluidly coupled to the first chamber, a second workport fluidly coupled to the second chamber, a reservoir port fluidly coupled to the fluid reservoir, and a pilot port fluidly coupled to the pilot pressure source to receive the pilot fluid signal, wherein the pilot fluid signal actuates the valve assembly to fluidly couple the first workport and the second workport to the reservoir port, thereby operating the piston in a float mode.

20 Claims, 6 Drawing Sheets

(51) Int. Cl.

| | | |
|---|---|---|
| *F15B 13/02* | (2006.01) | |
| *F15B 13/04* | (2006.01) | |
| *F16K 11/16* | (2006.01) | |

(56) References Cited

U.S. PATENT DOCUMENTS

| | | | | |
|---|---|---|---|---|
| 3,543,647 | A * | 12/1970 | Gregerson | F15B 13/04 91/449 |
| 3,613,508 | A * | 10/1971 | Krehbiel | F15B 13/04 91/464 |
| 3,795,178 | A * | 3/1974 | Roche | F15B 13/01 137/596.2 |
| 3,872,670 | A * | 3/1975 | Dezelan | E02F 9/2207 60/484 |
| 3,908,515 | A * | 9/1975 | Johnson | F15B 13/01 91/464 |
| 4,286,432 | A * | 9/1981 | Burrows | F15B 13/01 91/461 |
| 5,036,750 | A * | 8/1991 | Katayama | F15B 13/01 91/464 |
| 7,730,705 | B2 | 6/2010 | Kubinski | |
| 8,997,473 | B2 | 4/2015 | Olson et al. | |
| 9,068,322 | B2 * | 6/2015 | Park | F15B 13/015 |
| 9,234,533 | B2 | 1/2016 | Olson | |
| 10,619,652 | B2 | 4/2020 | Peterson et al. | |
| 2003/0111117 | A1 * | 6/2003 | Horn | F15B 13/01 137/596.2 |
| 2008/0121101 | A1 * | 5/2008 | Park | F15B 11/024 417/455 |
| 2009/0078111 | A1 * | 3/2009 | Hyang | F15B 13/01 137/512 |
| 2015/0315768 | A1 | 11/2015 | Jeong et al. | |

* cited by examiner

400

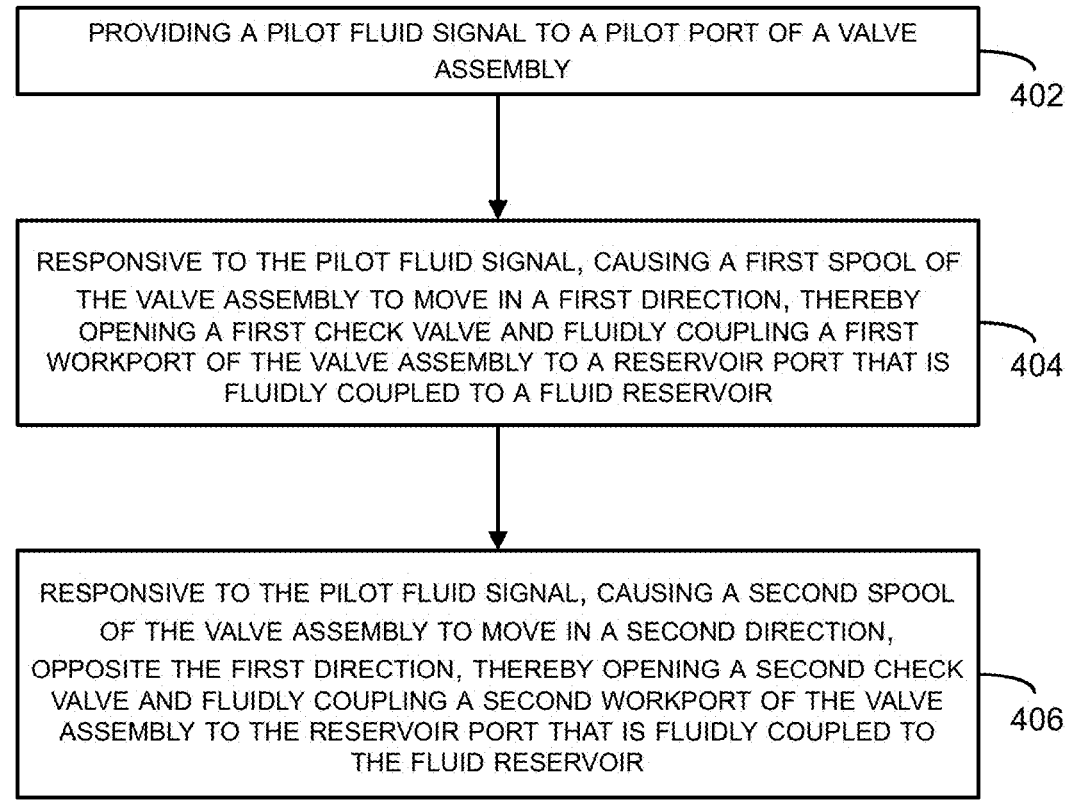

PROVIDING A PILOT FLUID SIGNAL TO A PILOT PORT OF A VALVE ASSEMBLY

402

RESPONSIVE TO THE PILOT FLUID SIGNAL, CAUSING A FIRST SPOOL OF THE VALVE ASSEMBLY TO MOVE IN A FIRST DIRECTION, THEREBY OPENING A FIRST CHECK VALVE AND FLUIDLY COUPLING A FIRST WORKPORT OF THE VALVE ASSEMBLY TO A RESERVOIR PORT THAT IS FLUIDLY COUPLED TO A FLUID RESERVOIR

404

RESPONSIVE TO THE PILOT FLUID SIGNAL, CAUSING A SECOND SPOOL OF THE VALVE ASSEMBLY TO MOVE IN A SECOND DIRECTION, OPPOSITE THE FIRST DIRECTION, THEREBY OPENING A SECOND CHECK VALVE AND FLUIDLY COUPLING A SECOND WORKPORT OF THE VALVE ASSEMBLY TO THE RESERVOIR PORT THAT IS FLUIDLY COUPLED TO THE FLUID RESERVOIR

ELECTRO-HYDRAULIC ACTUATOR WITH A PILOT-ACTUATED FLOAT MODE

CROSS REFERENCE TO RELATED APPLICATION

The present application claims priority to U.S. Provisional Application No. 63/510,956 filed on Jun. 29, 2023, the entire contents of which are herein incorporated by reference as if fully set forth in this description.

BACKGROUND

Existing elector-hydraulic actuators (EHAs) include a motor driving a pump, which provides fluid to a hydraulic cylinder to drive a piston disposed within the hydraulic cylinder. The piston can extend or retract based on the direction of fluid flow provided by the pump.

EHAs can typically allow extending, retracting, and holding the piston to lift an implement coupled to the piston, hold the implement in position, and in some cases apply a downward pressure on the implement to scrape or dig into a surface with which the implement is engaged.

It may be desirable in some applications to operate the EHA in other modes, however. Existing EHA systems do not allow such other modes. It is with respect to these and other considerations that the disclosure made herein is presented.

SUMMARY

The present disclosure describes implementations that relate to an electro-hydraulic actuator with a pilot-actuated float mode.

In a first example implementation, the present disclosure describes a valve assembly that controls fluid flow to and from a hydraulic cylinder actuator, wherein the valve assembly has (i) a first workport fluidly coupled to a first chamber of the hydraulic cylinder actuator, (ii) a second workport fluidly coupled to a second chamber of the hydraulic cylinder actuator, (iii) a reservoir port fluidly coupled to a fluid reservoir, and (iv) a pilot port fluidly coupled to a pilot pressure source to receive the pilot fluid signal, wherein the pilot fluid signal actuates the valve assembly to fluidly couple the first workport and the second workport to the reservoir port, thereby operating a piston of the hydraulic cylinder actuator in a float mode.

In a second example implementation, the present disclosure describes a hydraulic system that includes the valve assembly of the first example implementation.

In a third example implementation, the present disclosure describes a method of operating the valve assembly of the first example implementation or the hydraulic system of the second example implementation.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

FIG. 6 is a flowchart of a method for operating the valve assembly of FIG. 3 or the hydraulic systems of FIGS. 1-2, according to an example implementation.

DETAILED DESCRIPTION

It may be desirable in some machines having EHAs to operate an EHA in a float mode. For example, the EHA may be used in a surface engaging machine where a piston of the EHA is coupled to an implement that can engage a surface, and it may be desirable to allow the implement to follow the surface in some cases with minimal resistance.

For instance, in material moving applications, such as snow plowing, it may be desirable for a blade to follow the road. In grading applications, it may be desirable for a bucket of a loader to skim the gravel to level the surface. For agricultural tillage applications, it may be desirable for the gage wheels of a disk harrow to follow the surface of the soil to create a consistent depth of engagement. In these examples, it may be desirable to allow the piston to "float" to allow the implement to follow the terrain it interfaces with.

Disclosed herein are hydraulic systems having a pilot-actuated valve assembly that enables a hydraulic cylinder actuator to operate in a float mode.

Figure 1:
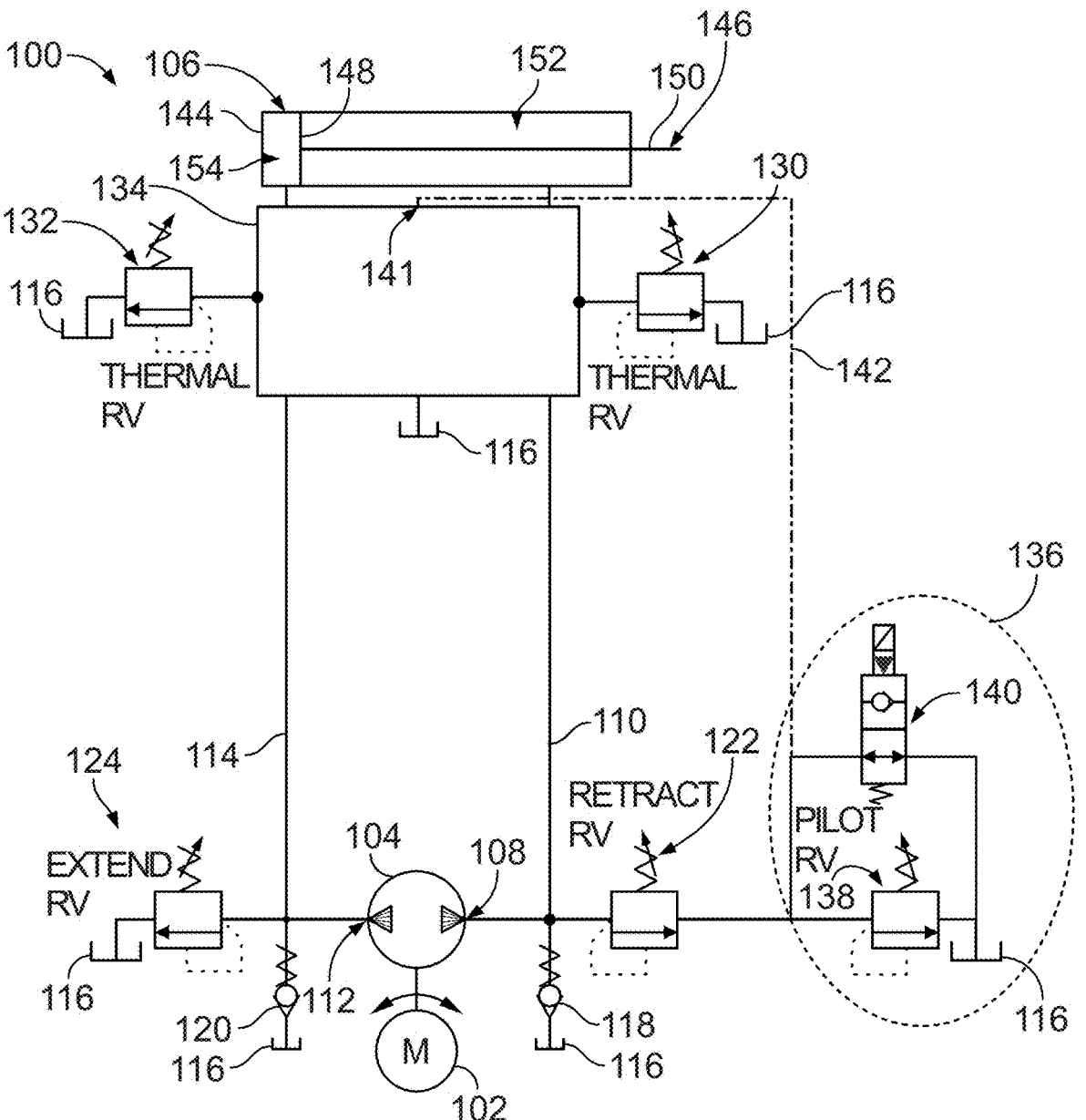
FIG. 1 illustrates a schematic of a hydraulic system, according to an example implementation.

FIG. 1 illustrates a schematic of a hydraulic system 100, according to an example implementation. The hydraulic system 100 can represent an EHA, for example. Components of the hydraulic system 100 can all be integrated into an assembly that is mounted directly to an implement of a machine.

The hydraulic system 100 includes a hydraulic power unit having an electric motor 102 driving a pump 104. The hydraulic power unit is configured to provide fluid flow and pressure to drive a hydraulic cylinder actuator 106.

Particularly, the hydraulic power unit controls the rate and direction of hydraulic fluid flow to the hydraulic cylinder actuator 106. Such control is achieved by controlling the speed and direction of rotation of an output shaft of the electric motor 102 used to drive the pump 104, which is configured as a bi-directional fluid flow source.

The pump 104 has a first pump port 108 connected to a fluid line 110. The pump 104 also has a second pump port 112 connected to a fluid line 114. The term "fluid flow line" is used throughout herein to indicate one or more fluid passages, conduits or the like that provide the indicated connectivity. Such fluid passages or conduits can be formed in a manifold, for example. The pump 104 is configured to discharge fluid to the fluid line 110 or the fluid line 114 based on the direction of rotation in which the electric motor 102 drives the pump 104.

The hydraulic system 100 also includes a fluid reservoir 116 configured as a low pressure fluid tank or container storing fluid at low pressure (e.g., atmospheric pressure or pressure in a range between 0 and 70 pounds per square inch, for example). The fluid reservoir 116 is drawn in several locations in the hydraulic system 100 to reduce visual clutter in the drawing. It should be understood, however, that the hydraulic system 100 can include one fluid reservoir.

The fluid line 110 includes a check valve 118 that prevents back flow from the pump 104 to the fluid reservoir 116, but rather allows fluid discharged from the first pump port 108 of the pump 104 to flow to the hydraulic cylinder actuator 106 via the fluid line 110. The check valve 118 also allows fluid returning from the hydraulic cylinder actuator 106 via the fluid line 110 to be provided to the first pump port 108, rather than flowing to the fluid reservoir 116.

Similarly, the fluid line 114 includes a check valve 120 that prevents back flow from the pump 104 to the fluid reservoir 116, but rather allows fluid discharged from the second pump port 112 of the pump 104 to flow via the fluid line 114 to the hydraulic cylinder actuator 106. The check valve 120 also allows fluid returning from the hydraulic cylinder actuator 106 via the fluid line 114 to be provided to the second pump port 112, rather than flowing to the fluid reservoir 116.

The hydraulic system 100 can further include a pressure relief valve 122 connected between the fluid line 110 and the fluid reservoir 116, wherein the pressure relief valve 122 is configured to protect the first pump port 108. The hydraulic system 100 can also include a pressure relief valve 124 connected between the fluid line 114 and the fluid reservoir 116, where the pressure relief valve 124 is configured to protect the second pump port 112. Particularly, the pressure relief valves 122, 124 are configured to open and provide a fluid flow path to the fluid reservoir 116 when pressure level of fluid in the fluid lines 110, 114, respectively, exceeds a threshold pressure value. This way, the pump 104 is protected from over-pressurization.

In an example, the hydraulic system 100 can further include a thermal relief valve 130 that is fluidly coupled to the fluid line 110. The hydraulic system 100 can also include a thermal relief valve 132 that is fluidly coupled to the fluid line 114. The thermal relief valves 130, 132 protect the hydraulic system 100 from excessive pressure buildup caused by overheating and expansion of fluid in the fluid lines 110, 114. Particularly, the thermal relief valves 130, 132 open and release pressure when the temperature of fluid exceeds a certain threshold temperature value. Such threshold temperature is typically set just below the temperature at which the hydraulic system 100 (any of the components thereof) is likely to be damaged or fail due to overheating.

The hydraulic system 100 includes a valve assembly 134 that is pilot operated via a pilot fluid signal received at a pilot port 141 via a pilot line 142. As described in more detailed below, the valve assembly 134 is configured to enable operating the hydraulic cylinder actuator 106 in a float mode when the pilot fluid signal is received at the pilot port 141.

The hydraulic cylinder actuator 106 includes a cylinder 144 and a piston 146 that is axially movable within the cylinder 144. The piston 146 includes a piston head 148 and a rod 150 extending from the piston head 148 along a central longitudinal axis of the cylinder 144. The rod 150 can be coupled to an implement of a surface engaging machine, for example. The piston head 148 divides the internal space of the cylinder 144 into a first chamber 152 (e.g., rod-side chamber) and a second chamber 154 (e.g., head-side chamber).

The piston head 148 can have a diameter DH, and the rod 150 can have a diameter DR. As such, fluid in the second chamber 154 interacts with a cross-sectional surface area of piston head 148 that can be referred to as piston head area and is equal to $$A_H = \pi \frac{D_H^2}{4}.$$

On the other hand, fluid in the first chamber 152 interacts with an annular surface area of the piston 146 that can be referred to as piston annular area $$A_{Annular} = \pi \frac{D_H^2 - D_R^2}{4}.$$

The area $A_{Annular}$ is smaller than the piston head area $A_H$. Thus, as the piston 146 extends (e.g., moves to the right in FIG. 1) or retracts (e.g., moves to the left in FIG. 1) within the cylinder 144, the amount of fluid flow $Q_H$ flowing into or being discharged from the second chamber 154 is greater than the amount of fluid flow $Q_{Annular}$ being discharged from or flowing into the first chamber 152. Particularly, if the piston 146 is moving at a particular velocity V, then $Q_H = A_H V$ is greater than $Q_{Annular} = A_{Annular} V$. The difference in flow can be determined as $Q_{Rod} = Q_H - Q_{Annular} = A_R V$, where $A_R$ is the cross-sectional area of the rod 150 and is equal to $$\pi \frac{D_R^2}{4}.$$

With this configuration, the hydraulic cylinder actuator 106 can be referred to as an unbalanced actuator as fluid flow to/from one chamber thereof is not equal to fluid flow to/from the other chamber.

In the load-holding mode of operation, the electric motor 102 is not actuated to drive the pump 104, and thus no fluid is provided to the valve assembly 134 or the hydraulic cylinder actuator 106. The valve assembly 134 also blocks fluid from being discharged from the hydraulic cylinder actuator 106. As such, in this mode, the hydraulic cylinder actuator 106 operates in a load-holding mode where the piston 146 remains locked in position, and no fluid is provided to or is discharged from the hydraulic cylinder actuator 106.

When it is desirable to move the piston 146 (e.g., to extend or retract the piston 146), a controller of the hydraulic system 100 can send command signals to operate the electric motor 102. The electric motor 102 then drives the pump 104 to provide fluid flow to the hydraulic cylinder actuator 106.

For example, to retract the piston 146, the electric motor 102 can drive the pump 104 in a first direction such that the pump 104 provides fluid flow through the first pump port 108 to the fluid line 110. Fluid is then flows through the valve assembly 134 to the first chamber 152, causing the piston 146 to retract (e.g., move to the left in FIG. 1) and causing fluid to be discharged from the second chamber 154, then flow through the valve assembly 134 to the fluid line 114, then to the second pump port 112. This way, the pump 104 operates in a closed-circuit configuration, where fluid is received at the second pump port 112, then displaced to the first pump port 108.

As mentioned above, the flow rate of fluid discharged from the second chamber 154 is larger than the flow rate of fluid provided to the first chamber 152. Thus, the pump 104 displaces fluid to the first pump port 108 at a higher flow rate than demanded by the first chamber 152. Thus, a portion of the fluid flows to first chamber 152, while excess flow (e.g., $Q_{Rod}$) that is not provided to the first chamber 152 is dissipated through the pressure relief valve 122 to the fluid reservoir 116.

To extend the piston 146, the electric motor 102 can drive the pump 104 in a second direction (opposite the first direction) such that the pump 104 provides fluid flow through the second pump port 112 to the fluid line 114. Fluid then flows through the valve assembly 134 to the second chamber 154, causing the piston 146 to extend (e.g., move to the right in FIG. 1) and causing fluid to be discharged from the first chamber 152, then flow through the valve assembly 134 to the fluid line 110.

Fluid discharged to the fluid line 110 returns to the first pump port 108, and the pump 104 displaces such fluid to the second pump port 112 to be provided to the second chamber 154 to complete the fluid circuit. However, flow rate of fluid received at the first pump port 108 from the first chamber 152 is less than the flow rate of fluid flowing to the second chamber 154 as mentioned above. Thus, the pump 104 can draw make up flow (e.g., $Q_{Rod}$) from the fluid reservoir 116 to join fluid discharged from the first chamber 152 at the first pump port 108.

Advantageously, the valve assembly 134 enables the hydraulic cylinder actuator 106 to operate in an additional mode that can be referred to as the float mode. In the float mode, both the first chamber 152 and the second chamber 154 are fluidly coupled to the fluid reservoir 116, thereby allowing the piston 146 to "float", thus being able to move slightly in either direction with minimal resistance to allow an implement coupled thereto to follow a terrain or surface.

To actuate the valve assembly 134 in a manner that enables the float mode, a pilot fluid signal is generated and provided to the pilot port 141 of the valve assembly 134. Such pilot fluid signal can be generated in various way.

In one example, as depicted in FIG. 1, the pilot fluid signal can be generated via a pilot pressure source 136. Particularly, the pilot pressure source 136 can receive fluid from the pump 104 through the pressure relief valve 122, and generate the pilot fluid signal.

The pilot pressure source 136 includes a pilot relief valve 138 disposed downstream of the pressure relief valve 122. The pilot pressure source 136 also includes an electrically-actuated valve 140 that is configured to either allow fluid discharged from the pressure relief valve 122 to flow to the fluid reservoir 116 or flow through a pilot line 142 to the valve assembly 134 to provide the pilot fluid signal thereto.

In an example, the electrically-actuated valve 140 can be solenoid operated and can be configured to be normally-open in a first state of operation, such that when the solenoid is not energized, fluid discharged from the pressure relief valve 122 flows freely through the electrically-actuated valve 140 to the fluid reservoir 116. When the solenoid is energized, the electrically-actuated valve 140 switches to a second state of operation, blocking fluid flow to the fluid reservoir 116, thereby allowing fluid to flow through the pilot line 142 to the pilot port 141 of the valve assembly 134 to enable the float mode.

The pilot relief valve 138 protects the pilot line 142 from over pressurization. As long as pressure level of fluid discharged by the pressure relief valve 122 to the pilot line 142 does not exceed the pressure setting of the pilot relief valve 138, fluid is allowed to flow through the pilot line 142 to the valve assembly 134. If, however, pressure level of fluid discharged by the pressure relief valve 122 exceeds the pressure setting of the pilot relief valve 138, the pilot relief valve 138 opens to relieve fluid to the fluid reservoir 116.

Other pilot pressure source configurations can be used.

Figure 2:
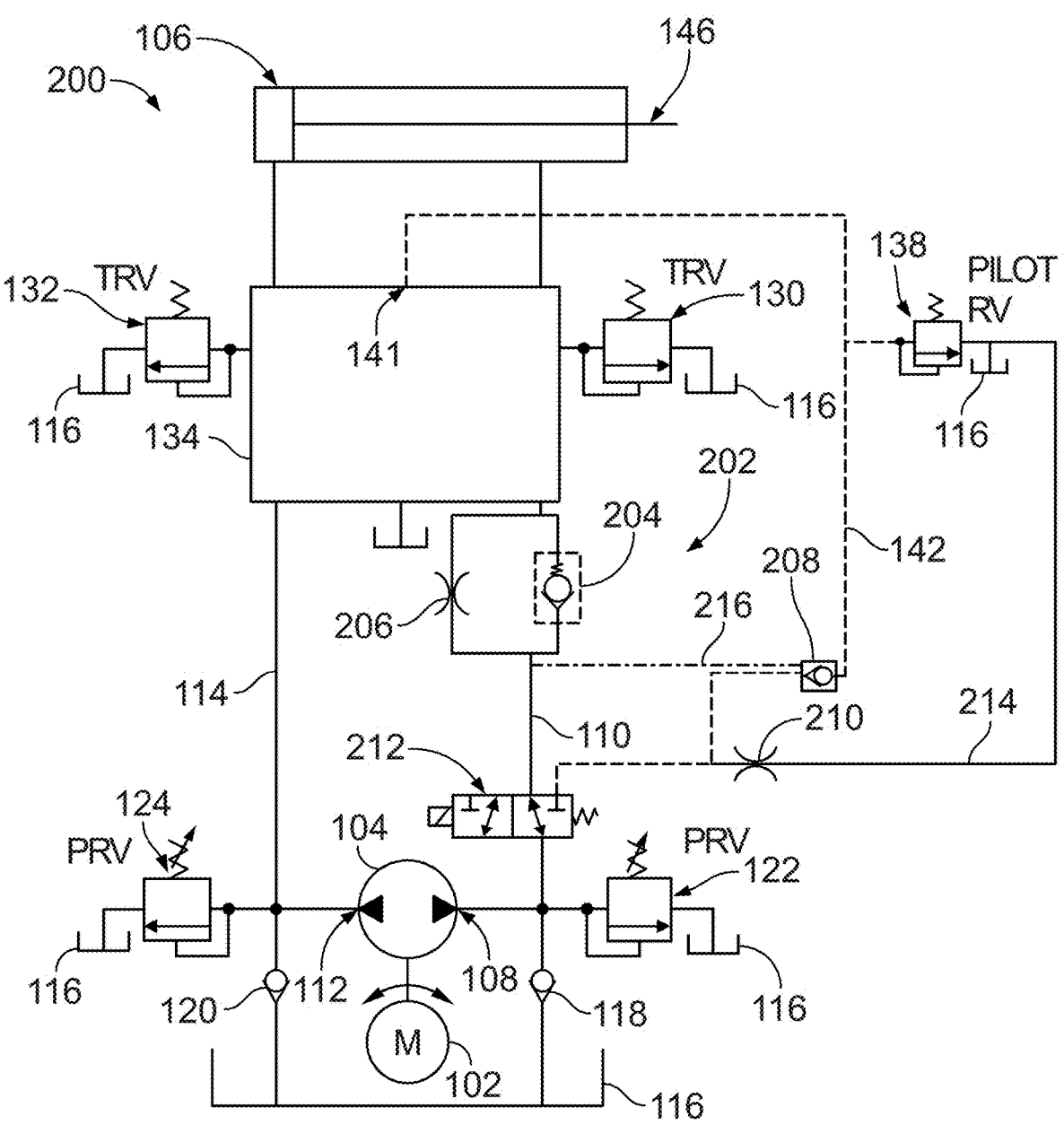
FIG. 2 illustrates a hydraulic system with another pilot pressure source configuration, according to an example implementation.

FIG. 2 illustrates a hydraulic system 200 with another pilot pressure source configuration, according to an example implementation. The hydraulic system 200 includes several components of the hydraulic system 100, and such common components are designated with the same reference numbers.

The hydraulic system 200 includes an pilot pressure source 202 that includes a backpressure valve 204, a drain orifice 206 disposed in parallel with the backpressure valve 204, a pilot-operated (PO) check valve 208, a pilot drain orifice 210, and an electrically-actuated valve 212 (e.g., a 3 way/2-position valve). The backpressure valve 204 is depicted as a spring-loaded check valve, but other configurations (e.g., a relief valve) can be used.

The PO check valve 208 allows fluid to flow freely therethrough from the electrically-actuated valve 212 to the pilot line 142. The PO check valve 208 allows fluid flow in the reverse direction, from the pilot line 142 to a fluid line 214, when a pilot signal is provided to its pilot port via fluid line 216.

When operating of the hydraulic system 200 in the extend, retract, or load-holding modes, the electrically-actuated valve 212 operates in the state shown in FIG. 2. In this state, the electrically-actuated valve 212 is not actuated (e.g., its solenoid is not energized), and thus fluid is allowed to flow to and from the first pump port 108 through the electrically-actuated valve 212.

For example, to retract the piston 146, the pump 104 provides flow through the electrically-actuated valve 212, then through the backpressure valve 204 and the valve assembly 134 to the hydraulic cylinder actuator 106. When extending the piston 146, fluid discharged from the hydraulic cylinder actuator 106 flows through the valve assembly 134, then the drain orifice 206, then the electrically-actuated valve 212 back to the first pump port 108 of the pump 104.

High pressure fluid in the fluid line 110 is provided to the pilot port of the PO check valve 208 via the fluid line 216, thereby opening the PO check valve 208 and allowing fluid in the pilot line 142 to be drained to the fluid reservoir 116 via the pilot drain orifice 210 and the fluid line 214. This ensures that the pilot port of the valve assembly 134 does not receive a pilot pressure signal that actuates the float mode when not desired.

When the piston 146 is not moving (stationary), any fluid trapped in the fluid line 110 (e.g., between the valve assembly 134 and the drain orifice 206) can drain through the drain orifice 206 and the electrically-actuated valve 212. Such fluid may then flow through the pressure relief valve 122 to the fluid reservoir 116 once enough pressure builds up.

To actuate the float mode, the pump 104 is driven by the electric motor 102 for a particular period of time (e.g., 3 seconds) to provide fluid flow through the first pump port 108. The electrically-actuated valve 212 is also actuated (e.g., its solenoid can be energized) to operate in a second state that allows fluid from the first pump port 108 to flow through the electrically-actuated valve 212 to the PO check valve 208 and the fluid line 214. The pilot drain orifice 210 operates as a restriction that allows fluid pressure to increase upstream of the pilot drain orifice 210. Fluid with such increased pressure is allowed to flow freely through the PO check valve 208 to the pilot port 141 of the valve assembly 134 to actuate the float mode as described below.

After the particular, brief, period of time that allows the pump 104 to provide fluid to actuate the float mode, the electric motor 102 can stop driving the pump 104, and the electrically-actuated valve 212 may be returned to the unactuated state. Advantageously, the current or electric power used to activate the float mode is thus minimal. The PO check valve 208 prevents back flow from the fluid line 142, and thus allows the fluid line 142 to maintain its high pressure fluid, thereby maintaining the valve assembly 134 operating in the float mode. Even if the electrically-actuated valve 212 stays actuated, the PO check valve 208 prevents back flow to the pump 104.

To deactivate the float mode, the electrically-actuated valve 212 is operated in the unactuated state, and the pump 104 is driven to allow fluid flow to the fluid line 110 through the first pump port 108. The backpressure valve 204 allows pressure to build up upstream thereof, actuating the PO check valve 208 via fluid in the fluid line 216 (which branches from the fluid line 110). This allows fluid in the pilot line 142 to drain through the PO check valve 208, then through the pilot drain orifice 210 and the fluid line 214 to the fluid reservoir 116. At any time if pressure level in the pilot line 142 exceeds a threshold value, the pilot relief valve 138 can open to relieve fluid to the fluid reservoir 116.

Thus, whether the pilot pressure source 136, the pilot pressure source 202, or other alternative configurations (e.g., a separate charge pump or accumulator) are used, a pilot pressure signal can be generated when desired and provided to the pilot port 141 of the valve assembly 134. The valve assembly 134 then enables the hydraulic cylinder actuator 106 to operate in the float mode.

Figure 3:
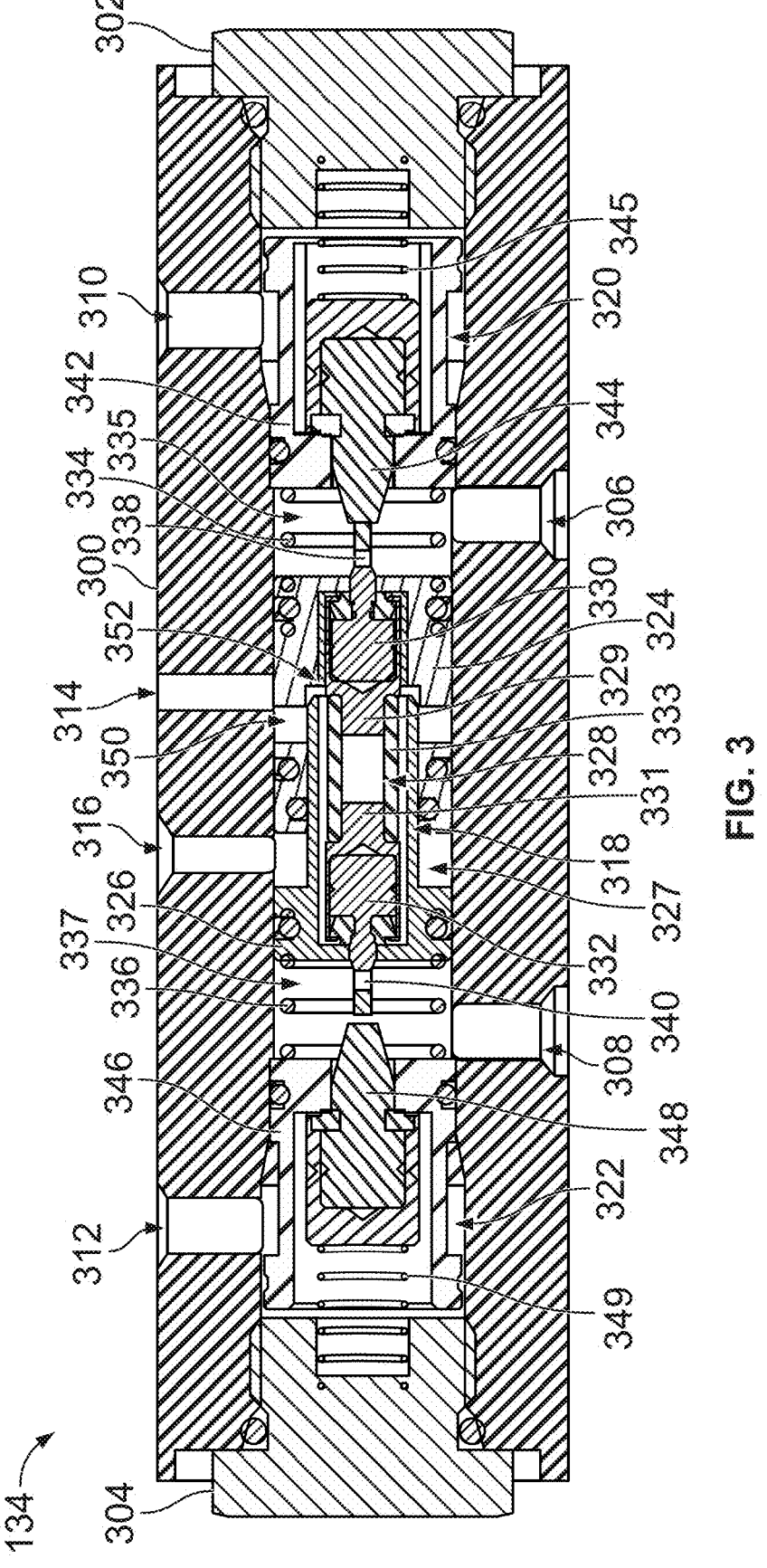
FIG. 3 illustrates a cross-sectional valve of a valve assembly, according to an example implementation.

FIG. 3 illustrates a cross-sectional valve of the valve assembly 134, according to an example implementation. The valve assembly 134 includes a housing 300 that has a cylindrical cavity formed therein. A first end cap 302 is mounted at a first end of the housing 300, and a second end cap 304 is mounted at a second end of the housing 300, opposite the first end.

The housing 300 defines or includes a plurality of ports including: (i) a first port 306 that is fluidly coupled to the first pump port 108 via the fluid line 110, (ii) a second port 308 that is fluidly coupled to the second pump port 112 via the fluid line 114, (iii) a first workport 310 that is fluidly coupled to the first chamber 152 of the hydraulic cylinder actuator 106, (iv) a second workport 312 that is fluidly coupled to the second chamber 154 of the hydraulic cylinder actuator 106, (v) a reservoir port 314 that is fluidly coupled to the fluid reservoir 116, and (vi) a pilot port 316 that is fluidly coupled to, and can receive a pilot fluid signal from, the pilot line 142. The pilot port 316 represents the pilot port 141 shown in FIGS. 1-2.

The valve assembly 134 includes a two-piece expandable spool valve 318 positioned between a first check valve 320 and a second check valve 322. The two-piece expandable spool valve 318 and the check valves 320, 322 cooperate to facilitate operating the hydraulic system 100 in the various modes described herein.

The two-piece expandable spool valve 318 includes a two-piece spool having an first spool 324 and an second spool 326, separated by annular chamber 327. The second spool 326 is disposed, at least partially, within the first spool 324 as depicted in FIG. 3. As such, in the example configuration of FIG. 3, the first spool 324 can be referred to as an outer spool, and the second spool 326 can be referred to as an inner spool. With this configuration, each of the spools 324, 326 guide the axial movement of the other spool and keep each other aligned.

The first spool 324 and the second spool 326 can move together as a single element or can move apart relative to each other as described below. As such, the two-piece spool can be referred to as a telescopic spool.

The first spool 324 and the second spool 326 are hollow, and they together form a cavity therein. The two-piece expandable spool valve 318 further includes a central check assembly 328 disposed in the cavity formed within the first spool 324 and the second spool 326. The central check assembly 328 includes a first check element 330 (e.g., a poppet) disposed within a check body 329. The central check assembly 328 also includes a second check element 332 (e.g., a poppet) disposed within a check body 331. The central check assembly 328 further includes a spacer 333 interposed between the check body 329 and the check body 331 as shown to maintain the spatial positioning therebetween. In another example implementation, the central check assembly 328 can be formed as a single machined component of unitary construction rather than three separate pieces.

The first spool 324 is configured as a seat for the first check element 330. Particularly, as depicted, the first spool 324 has an axial hole through which a nose section of the first check element 330 is disposed in the state shown in FIG. 3. Similarly, the second spool 326 is configured as a seat for the second check element 332. Particularly, as depicted, the second spool 326 has an axial hole through which a nose section of the second check element 332 is disposed in the state shown in FIG. 3.

The two-piece expandable spool valve 318 further includes a first centering spring 334 disposed in a spring chamber 335 and applying a biasing force on the first spool 324 toward the second spool 326 (toward a center of the valve assembly 134). The two-piece expandable spool valve 318 also includes a second centering spring 336 disposed in a spring chamber 337 and applying a biasing force on the second spool 326 toward the first spool 324 (also toward a center of the valve assembly 134). The centering springs 334, 336 thus bias the first spool 324 and the second spool 326 to the neutral position shown in FIG. 3, where in the neutral position the first spool 324 blocks the reservoir port 314.

Figure 5:
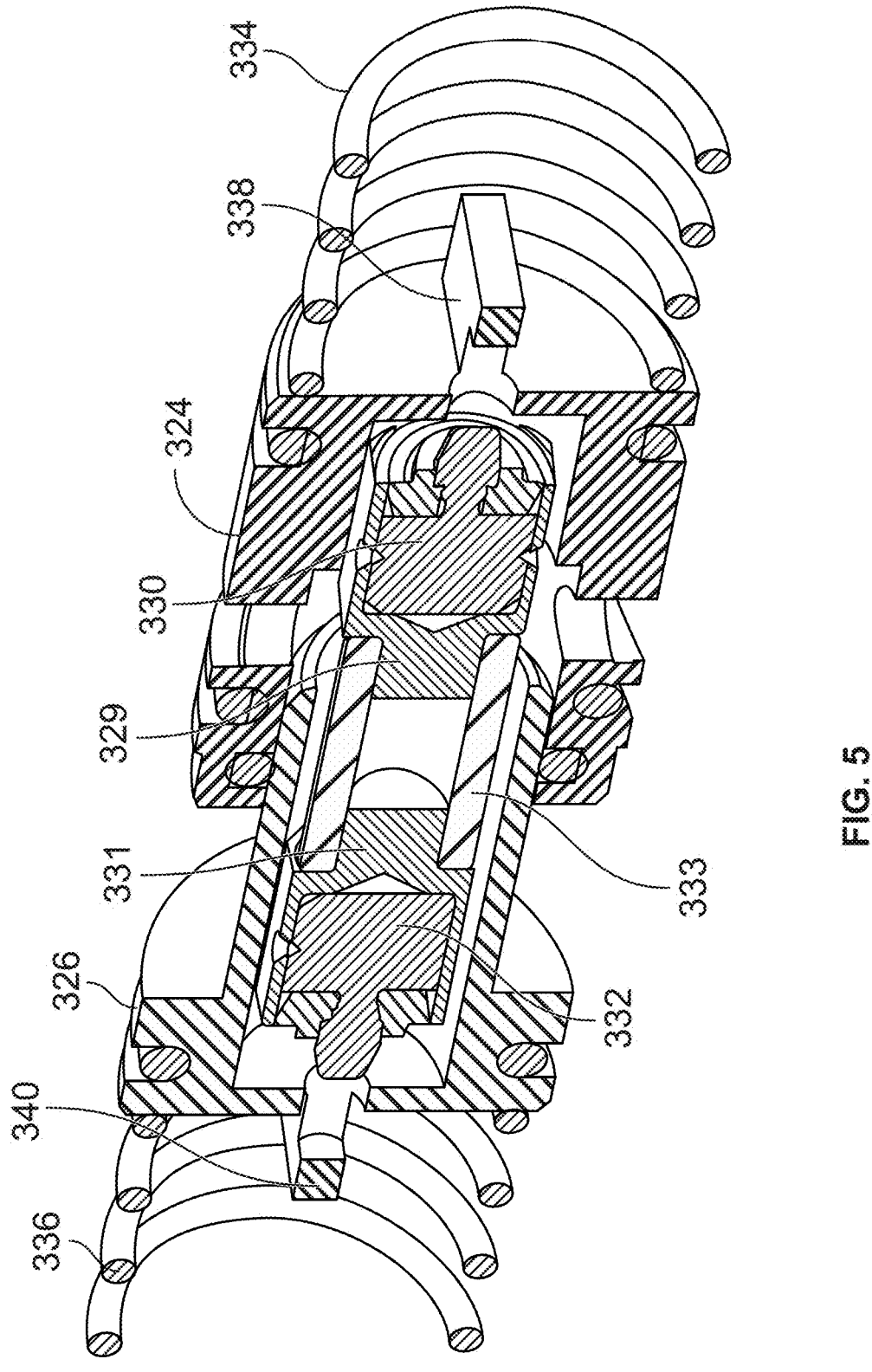
FIG. 5 illustrates a perspective view of a two-piece expandable spool valve of the valve assembly of FIGS. 3-4 in the float mode, according to an example implementation.

The first spool 324 has a protrusion 338 (e.g., a tang or snout as shown in FIG. 5) extending within the first centering spring 334. Similarly, the second spool 326 has a protrusion 340 extending within the second centering spring 336.

The first check valve 320 is disposed adjacent the first spool 324, and the second check valve 322 is disposed adjacent the second spool 326. The first check valve 320 includes a seat member 342 and a check element 344 (e.g., a poppet) disposed, at least partially, within the seat member 342. A check spring 345 disposed between the first end cap 302 and the check element 344 biases the check element 344 to be seated against an interior surface of the seat member 342. In the seated position shown in FIG. 3, the check element 344 blocks fluid flow between the first port 306 and the first workport 310.

Similarly, the second check valve 322 includes a seat member 346 and a check element 348 (e.g., a poppet) disposed, at least partially, within the seat member 346. A check spring 349 disposed between the second end cap 304 and the check element 348 biases the check element 348 to be seated against an interior surface of the seat member 346. In the seated position shown in FIG. 3, the check element 348 blocks fluid flow between the second port 308 and the second workport 312.

With this configuration, the check valves 320, 322 operate as load-holding valves that prevent motion of the piston 146 of the hydraulic cylinder actuator 106 when no fluid is provided to the first port 306, the second port 308, or the pilot port 316 of the valve assembly 134. Particularly, the check valves 320, 322 block fluid flow from the workports 310, 312, causing the hydraulic cylinder actuator 106 to operate in a load-holding mode where the implement coupled to the piston 146 is locked in placed.

Referring to FIG. 1 or 2, and 3 together, to retract the piston 146, fluid from the pump 104 is provided to the first port 306, then flows to the spring chamber 335 of the first centering spring 334, unseating the check element 344 off the seat member 342 and allowing fluid to flow to the first workport 310. For example, the seat member 342 can have a plurality of cross-holes (not shown) that allow fluid to flow therethrough from the first port 306 to the first workport 310 once the check element 344 is unseated. Fluid then flows from the first workport 310 to the first chamber 152 of the hydraulic cylinder actuator 106. Fluid discharged from the second chamber 154 as the piston 146 retracts is received at the second workport 312.

Further, pressurized fluid in the spring chamber 335 of the first centering spring 334 shifts the first spool 324 (to the left in FIG. 3), which in turn causes the second spool 326 to shift therewith toward the check element 348 due to interaction between a shoulder 352 formed in the first spool 324 with an end of the second spool 326. As the second spool 326 moves toward the check element 348, the protrusion 340 of the second spool 326 contacts the check element 348 and causes it to be unseated off the seat member 346, thereby allowing return fluid received at the second workport 312 to flow to the second port 308 (e.g., through cross-holes in the seat member 346), then to the fluid line 114 back to the pump 104. Excess flow due to the differential areas of the piston 146 can be relieved through the pressure relief valve 122 as mentioned above.

Conversely, to extend the piston 146, fluid from the pump 104 is provided to the second port 308, then flows to the spring chamber 337 of the second centering spring 336, unseating the check element 348 off the seat member 346 and allowing fluid to flow (e.g., through cross-holes in the seat member 346) to the second workport 312 then to the second chamber 154. Fluid discharged from the first chamber 152 is received at the first workport 310.

Pressurized fluid in the spring chamber 337 of the second centering spring 336 also shifts the second spool 326 (to the right in FIG. 3), which in turn causes the first spool 324 to shift therewith (due to interaction of the end of the second spool 326 with the shoulder 352 of the first spool 324) toward the check element 344. The protrusion 338 of the first spool 324 causes the check element 344 to be unseated off the seat member 342, thereby allowing return fluid received at the first workport 310 to flow (e.g., through cross-holes in the seat member 342) to the first port 306, then to the fluid line 110.

In a load-holding mode, the pump 104 does not supply fluid to either of the ports 306, 308. The first centering spring 334 biases the first spool 324 away from the check element 344, and the second centering spring 336 biases the second spool 326 away from the check element 348. Thus, the check elements 344, 348 remain seated and block fluid flow from the workports 310, 312 to the ports 306, 308. This way, the load (e.g., the implement) coupled to the piston 146 remains held in position.

The valve assembly 134 further enables operating the hydraulic system 100, 200 in a float mode. Referring back to FIGS. 1-2, in the float mode, a pilot fluid signal is generated by the pilot pressure source 136, 202 and provided to the valve assembly 134. Such pilot fluid signal is provided via the pilot line 142 to the pilot port 316 shown in FIG. 3.

Referring to FIG. 3, fluid received at the pilot port 316 is communicated to the annular chamber 327 of the valve assembly 134. The pilot fluid signal in the annular chamber 327 then pushes apart or separates the first spool 324 from the second spool 326. Particularly, the first spool 324 is pushed against the first centering spring 334 in a first direction toward the check element 344, and the second spool 326 is pushed in a second direction (opposite the first direction) against the second centering spring 336 toward the check element 348. As a result, the first spool 324 unseats the check element 344, and the second spool 326 unseats the check element 348.

Figure 4:
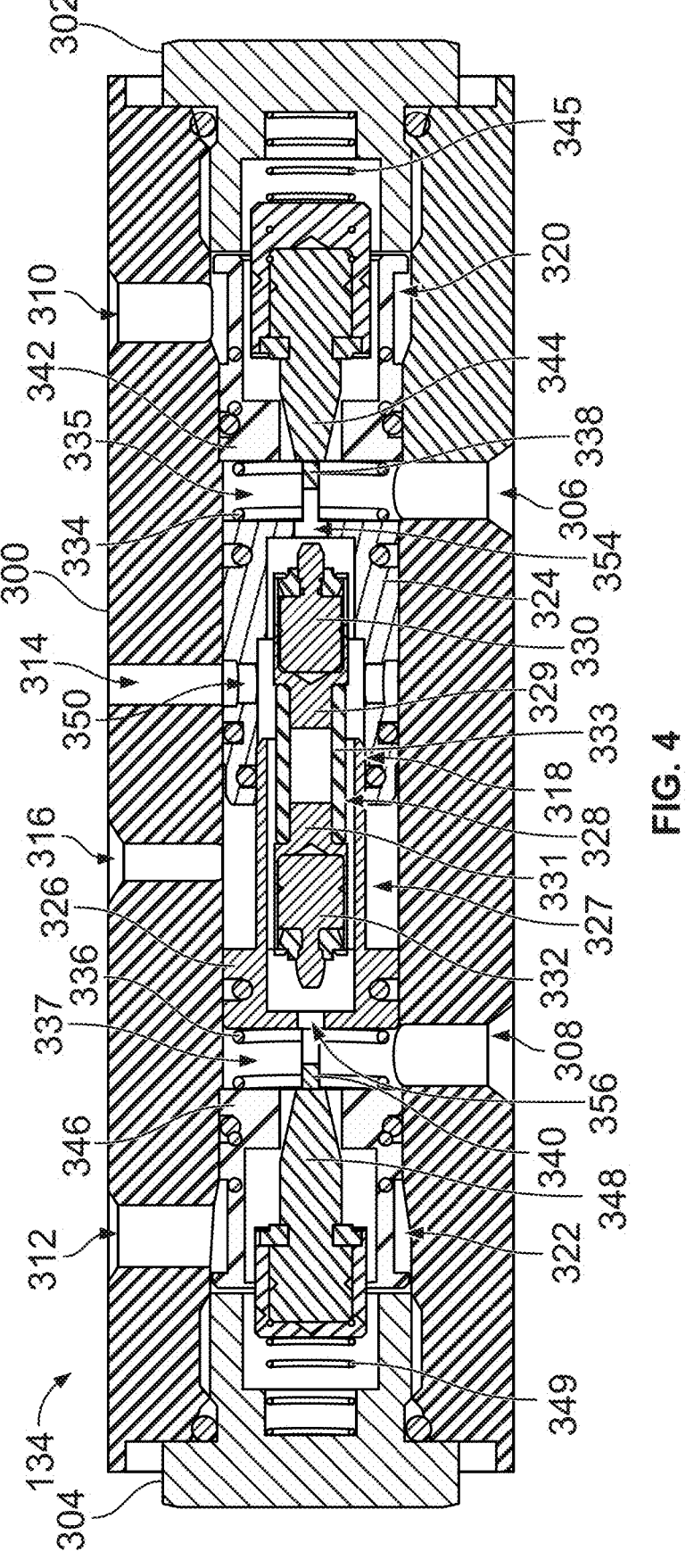
FIG. 4 illustrates the valve assembly of FIG. 3 operating in a float mode, according to an example implementation.

FIG. 4 illustrates the valve assembly 134 operating in a float mode, and FIG. 5 illustrates a perspective view of the two-piece expandable spool valve 318 in the float mode, according to an example implementation. As depicted in FIGS. 4-5, as the first spool 324 and the second spool 326 move in opposite directions, the central check assembly 328 remain substantially in position (e.g., due to fluid disposed on both sides of the central check assembly 328).

As the first spool 324 moves, while the first check element 330 remains in place, a fluid path is opened from the first workport 310 through the first check valve 320 (because the check element 344 is unseated by the protrusion 338 of the first spool 324), then through flow area 354 formed as the first spool 324 moves relative to the first check element 330, to within the first spool 324. As depicted, the outer diameter of the check body 329 is smaller than the inner diameter of the first spool 324.

Further, the first spool 324 has a plurality of cross-holes, such as cross-hole 350, disposed in a circular array about the first spool 324. These cross-holes become aligned with the reservoir port 314 as shown in FIG. 4. Thus, the first workport 310 becomes fluidly coupled to the reservoir port 314, which is fluidly coupled to the fluid reservoir 116.

Similarly, as the second spool 326 moves, while the second check element 332 remains in position, a fluid path is opened from the second workport 312 through the second check valve 322 (because the check element 348 is unseated by the protrusion 340 of the second spool 326), then through flow area 356 formed as the second spool 326 moves relative to the second check element 332, to within the second spool 326 and the first spool 324.

As depicted, the outer diameters of the check body 331 and the spacer 333 are smaller than the inner diameter of the second spool 326. Thus, as the cross-hole 350 of the first spool 324 is aligned with the reservoir port 314, the second workport 312 becomes fluidly coupled the reservoir port 314, which is fluidly coupled to the fluid reservoir 116.

In this state, the first workport 310 and the second workport 312 are both fluidly coupled to the reservoir port 314 (and thus to the fluid reservoir 116). This allows an implement coupled to the piston 146 to follow a terrain or surface. As the piston 146 retracts or extends due to variation in the surface height, fluid is allowed to flow unrestricted between the first workport 310, the second workport 312, and the reservoir port 314 to accommodate movement of the piston 146 and the implement.

When it is desired to exit the float mode, the electrically-actuated valve 140, 212 may be unactuated as described above to remove the pilot fluid signal from the pilot port 316. The centering springs 334, 336 then return the first spool 324 and the second spool 326, respectively, to the neutral position shown in FIG. 3, allowing the check elements 344, 348 to be reseated, blocking flow from the hydraulic cylinder actuator 106 received at the workports 310, 312. Further, as the first spool 324 moves back to the neutral position, the first check element 330 is reseated, and as the second spool 326 moves back to the neutral position, the second check element 332 is also reseated.

FIG. 6 is a flowchart of a method 400 for operating the valve assembly 134 or the hydraulic systems 100, 200, according to an example implementation.

The method 400 may include one or more operations, functions, or actions as illustrated by one or more of blocks 402-406. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flow-charts show functionality and operation of one possible implementation of present examples. Alternative implementations are included within the scope of the examples of the present disclosure in which functions may be executed out of order from that shown or discussed, including substan-tially concurrent or in reverse order, depending on the functionality involved, as would be understood by those reasonably skilled in the art.

At block 402, the method 400 includes providing (e.g., via the pilot pressure source 136, 202) a pilot fluid signal to the pilot port 316 of the valve assembly 134.

At block 404, the method 400 includes, responsive to the pilot fluid signal, causing the first spool 324 of the valve assembly 134 to move in a first direction, thereby opening the first check valve 320 and fluidly coupling the first workport 310 of the valve assembly 134 to the reservoir port 314 that is fluidly coupled to the fluid reservoir 116.

At block 406, the method 400 includes, responsive to the pilot fluid signal, causing the second spool 326 of the valve assembly 134 to move in a second direction, opposite the first direction, thereby opening the second check valve 322 and fluidly coupling the second workport 312 of the valve assembly 134 to the reservoir port 314 that is fluidly coupled to the fluid reservoir 116.

The method 400 can further include any of the other steps or operations described throughout herein with respect to operation of the valve assembly 134 and the hydraulic systems 100, 200.

The detailed description above describes various features and operations of the disclosed systems with reference to the accompanying figures. The illustrative implementations described herein are not meant to be limiting. Certain aspects of the disclosed systems can be arranged and com-bined in a wide variety of different configurations, all of which are contemplated herein.

Further, unless context suggests otherwise, the features illustrated in each of the figures may be used in combination with one another. Thus, the figures should be generally viewed as component aspects of one or more overall imple-mentations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the compo-nents are actually configured and structured (with hardware and/or software) to enable such performance. In other examples, components of the devices and/or systems may be arranged to be adapted to, capable of, or suited for perform-ing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to those with skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illus-tration and are not intended to be limiting, with the true scope being indicated by the following claims, along with the full scope of equivalents to which such claims are entitled. Also, the terminology used herein is for the purpose of describing particular implementations only, and is not intended to be limiting.

Embodiments of the present disclosure can thus relate to one of the enumerated example embodiments (EEEs) listed below.

EEE 1 is a valve assembly comprising: a housing includ-ing (i) a first workport fluidly coupled to a first chamber of a hydraulic cylinder actuator, (ii) a second workport fluidly coupled to a second chamber of the hydraulic cylinder actuator, (iii) a reservoir port fluidly coupled to a fluid reservoir, (iv) a pilot port fluidly coupled to a pilot pressure source, and (v) a cavity defined therein; a first spool dis-posed in the cavity of the housing; and a second spool disposed in the cavity of the housing, wherein as the pilot port receives a pilot fluid signal from the pilot pressure source, the pilot fluid signal causes the first spool and the second spool to move apart from each other, thereby fluidly coupling the first workport and the second workport to the reservoir port.

EEE 2 is the valve assembly of EEE 1, wherein the second spool is disposed at least partially within the first spool, wherein movement of the first spool relative to the second spool enables fluidly coupling the first workport and the second workport to the reservoir port.

EEE 3 is the valve assembly of any of EEEs 1-2, further comprising: a central check assembly disposed within the first spool and the second spool, wherein the pilot fluid signal separates the first spool from the second spool such that the first spool moves in a first direction and the second spool moves in a second direction, opposite the first direc-tion, wherein movement of the first spool and the second spool relative to the central check assembly opens respective fluid paths between the first workport and the reservoir port and between the second workport and the reservoir port.

EEE 4 is the valve assembly of EEE 3, wherein the central check assembly comprises: a first check element disposed within a first check body, wherein the first spool is configured as a seat for the first check element; a second check element disposed within a second check body, wherein the second spool is configured as a respective seat for the second check element; and a spacer that is interposed between the first check body and the second check body to maintain spatial positioning therebetween.

EEE 5 is the valve assembly of any of EEEs 1-4, further comprising: a first check valve disposed adjacent the first spool; and a second check valve disposed adjacent the second spool, wherein movement of the first spool causes the first check valve to open and allow fluid flow to and from the first workport, and wherein movement of the second spool causes the second check valve to open and allow fluid flow to and from the second workport.

EEE 6 is the valve assembly of EEE 5, wherein the first spool has a protrusion that contacts and moves a check element of the first check valve to open the first check valve, and wherein the second spool has a respective protrusion that contacts and moves a respective check element of the second check valve to open the second check valve.

EEE 7 is the valve assembly of any of EEEs 1-6, further comprising: a first centering spring applying a biasing force on the first spool toward the second spool; and a second centering spring applying a respective biasing force on the second spool toward the first spool, wherein when the pilot fluid signal is provided to the pilot port, the first spool moves against the biasing force of the first centering spring, and the second spool moves against the respective biasing force of the second centering spring, and wherein as the pilot fluid signal is removed, the first centering spring returns the first spool to a neutral position, and the second centering spring returns the second spool to the neutral position.

EEE 8 is the valve assembly of any of EEEs 1-7, wherein the housing further comprises: a first port that is fluidly coupled to a first pump port; and a second port that is fluidly coupled to a second pump port, wherein: as fluid is provided to the first port from the first pump port, fluid pushes the first spool and the second spool together in a first direction, thereby fluidly coupling the first port to the first workport, and fluidly coupling the second workport to the second port, and as fluid is provided to the second port from the second pump port, fluid pushes the first spool and the second spool together in a second direction, thereby fluidly coupling the second port to the second workport, and fluidly coupling the first workport to the first port.

EEE 9 is the valve assembly of EEE 8, further comprising: a first check valve disposed adjacent the first spool; and a second check valve disposed adjacent the second spool, wherein: as fluid is provided to the first port, fluid opens the first check valve to allow fluid flow from the first port to the first workport, while pushing the first spool and the second spool in the first direction, causing the second spool to open the second check valve and allow fluid flow from the second workport to the second port; and as fluid is provided to the second port, fluid opens the second check valve to allow fluid flow from the second port to the second workport, while pushing the second spool and the first spool in the second direction, causing the first spool to open the first check valve and allow fluid flow from the first workport to the first port.

EEE 10 is a hydraulic system comprising: a hydraulic cylinder actuator having a cylinder and a piston axially movable in the cylinder, wherein the piston has a piston head that divides an internal space of the cylinder into a first chamber and a second chamber; a fluid reservoir; a pilot pressure source that generates a pilot fluid signal; and the valve assembly of any of EEEs 1-9, wherein the valve assembly controls fluid flow to and from the hydraulic cylinder actuator. For example, the valve assembly has (i) a first workport fluidly coupled to the first chamber, (ii) a second workport fluidly coupled to the second chamber, (iii) a reservoir port fluidly coupled to the fluid reservoir, and (iv) a pilot port fluidly coupled to the pilot pressure source to receive the pilot fluid signal, wherein the pilot fluid signal actuates the valve assembly to fluidly couple the first workport and the second workport to the reservoir port, thereby operating the piston in a float mode.

EEE 11 is the hydraulic system of EEE 10, wherein the valve assembly further comprises: a housing including the first workport, the second workport, the reservoir port, and the pilot port, wherein the housing includes a cavity therein; a first spool disposed in the cavity of the housing; and a second spool disposed in the cavity, wherein the second spool is disposed at least partially within the first spool, wherein movement of the first spool relative to the second spool enables fluidly coupling the first workport and the second workport to the reservoir port.

EEE 12 is the hydraulic system of EEE 11, wherein the valve assembly further comprises: a central check assembly fixedly disposed within the first spool and the second spool, wherein the pilot fluid signal separates the first spool from the second spool such that the first spool moves in a first direction and the second spool moves in a second direction, opposite the first direction, wherein movement of the first spool and the second spool relative to the central check assembly opens respective fluid paths between the first workport and the reservoir port and between the second workport and the reservoir port.

EEE 13 is the hydraulic system of EEE 12, wherein the valve assembly further comprises: a first check valve disposed adjacent the first spool; and a second check valve disposed adjacent the second spool, wherein movement of the first spool causes the first check valve to open and allow fluid flow to and from the first workport, and wherein movement of the second spool causes the second check valve to open and allow fluid flow to and from the second workport.

EEE 14 is the hydraulic system of any of EEEs 10-13, further comprising: a pump configured to be a bi-directional fluid flow source driven by an electric motor in opposite rotational directions to provide fluid flow to the first chamber or the second chamber of the hydraulic cylinder actuator to drive the piston, wherein the pilot pressure source: (i) receives fluid from the pump for a particular period of time after which the pump stops, (ii) generates the pilot fluid signal provided to the pilot port of the valve assembly, and (iii) maintains the pilot fluid signal to the pilot port after the particular period of time when the pump stops.

EEE 15 is the hydraulic system of EEE 14, wherein the pilot pressure source comprises: an electrically-actuated valve that operates in: (i) a first state, wherein the electrically-actuated valve allows fluid received from the pump to flow to the fluid reservoir, and (ii) a second state wherein the electrically-actuated valve blocks fluid received from the pump from flowing to the fluid reservoir, thereby allowing the fluid to flow to the pilot port of the valve assembly.

EEE 16 is the hydraulic system of any of EEEs 14-15, wherein the pilot pressure source comprises: a pilot-operated (PO) check valve that allows free flow to the pilot port, while allowing back flow from the pilot port when the PO check valve is actuated; and an electrically-actuated valve that operates in: (i) a first state, wherein the electrically-actuated valve allows fluid received from the pump to flow to the valve assembly, and (ii) a second state wherein the electrically-actuated valve allows fluid received during the particular period of time to flow through the PO check valve to the pilot port of the valve assembly to activate the float mode.

EEE 17 is the hydraulic system of EEE 16, wherein to deactivate the float mode, the pump provides fluid through the electrically-actuated valve operating in the first state, thereby actuating the PO check valve and allowing back flow from the pilot port to the fluid reservoir.

EEE 18 is method of operating the valve assembly of EEEs 1-9 or the hydraulic system of any of EEEs 10-17. For example, the method comprises: providing a pilot fluid signal to a pilot port of a valve assembly; responsive to the pilot fluid signal, causing a first spool of the valve assembly to move in a first direction, thereby opening a first check valve and fluidly coupling a first workport of the valve assembly to a reservoir port that is fluidly coupled to a fluid reservoir; and responsive to the pilot fluid signal, causing a second spool of the valve assembly to move in a second direction, opposite the first direction, thereby opening a second check valve and fluidly coupling a second workport of the valve assembly to the reservoir port that is fluidly coupled to the fluid reservoir.

EEE 19 is the method of EEE 18, wherein the first spool has a protrusion, and wherein the second spool has a respective protrusion, wherein: opening the first check valve comprises causing the protrusion of the first spool to contact a check element of the first check valve to open the first check valve; and opening the second check valve comprises causing the respective protrusion of the second spool to contact a respective check element of the second check valve to open the second check valve.

EEE 20 is the method of any of EEEs 18-19, wherein the valve assembly further comprises: (i) a first centering spring applying a biasing force on the first spool toward the second spool, and (ii) a second centering spring applying a respective biasing force on the second spool toward the first spool, wherein causing the first spool to move in the first direction comprises moving the first spool against the biasing force of the first centering spring, wherein causing the second spool to move in the second direction comprises moving the second spool against the respective biasing force of the second centering spring, and wherein the method further comprises: removing the pilot fluid signal; and causing the first centering spring to return the first spool to a neutral position, and the second centering spring to return the second spool to the neutral position, thereby causing the first check valve to block fluid flow to and from the first workport, and causing the second check valve to block fluid flow to and from the second workport.

What is claimed is:

1. A valve assembly comprising:
   a housing including (i) a first workport fluidly coupled to a first chamber of a hydraulic cylinder actuator, (ii) a second workport fluidly coupled to a second chamber of the hydraulic cylinder actuator, (iii) a reservoir port fluidly coupled to a fluid reservoir, (iv) a pilot port fluidly coupled to a pilot pressure source, and (v) a cavity defined therein;
   a first spool disposed in the cavity of the housing; and
   a second spool disposed in the cavity of the housing, wherein as the pilot port receives a pilot fluid signal from the pilot pressure source, the pilot fluid signal causes the first spool and the second spool to move apart from each other, thereby fluidly coupling the first workport and the second workport to the reservoir port.

2. The valve assembly of claim 1, wherein the second spool is disposed at least partially within the first spool, wherein movement of the first spool relative to the second spool enables fluidly coupling the first workport and the second workport to the reservoir port.

3. The valve assembly of claim 1, further comprising:
   a central check assembly disposed within the first spool and the second spool, wherein the pilot fluid signal separates the first spool from the second spool such that the first spool moves in a first direction and the second spool moves in a second direction, opposite the first direction, wherein movement of the first spool and the second spool relative to the central check assembly opens respective fluid paths between the first workport and the reservoir port and between the second workport and the reservoir port.

4. The valve assembly of claim 3, wherein the central check assembly comprises:
   a first check element disposed within a first check body, wherein the first spool is configured as a seat for the first check element;
   a second check element disposed within a second check body, wherein the second spool is configured as a respective seat for the second check element; and
   a spacer that is interposed between the first check body and the second check body to maintain spatial positioning therebetween.

5. The valve assembly of claim 1, further comprising:
   a first check valve disposed adjacent the first spool; and
   a second check valve disposed adjacent the second spool, wherein movement of the first spool causes the first check valve to open and allow fluid flow to and from the first workport, and wherein movement of the second spool causes the second check valve to open and allow fluid flow to and from the second workport.

6. The valve assembly of claim 5, wherein the first spool has a protrusion that contacts and moves a check element of the first check valve to open the first check valve, and wherein the second spool has a respective protrusion that contacts and moves a respective check element of the second check valve to open the second check valve.

7. The valve assembly of claim 1, further comprising:
   a first centering spring applying a biasing force on the first spool toward the second spool; and
   a second centering spring applying a respective biasing force on the second spool toward the first spool, wherein when the pilot fluid signal is provided to the pilot port, the first spool moves against the biasing force of the first centering spring, and the second spool moves against the respective biasing force of the second centering spring, and wherein as the pilot fluid signal is removed, the first centering spring returns the first spool to a neutral position, and the second centering spring returns the second spool to the neutral position.

8. The valve assembly of claim 1, wherein the housing further comprises:
   a first port that is fluidly coupled to a first pump port; and
   a second port that is fluidly coupled to a second pump port, wherein:
      as fluid is provided to the first port from the first pump port, fluid pushes the first spool and the second spool together in a first direction, thereby fluidly coupling the first port to the first workport, and fluidly coupling the second workport to the second port, and
      as fluid is provided to the second port from the second pump port, fluid pushes the first spool and the second spool together in a second direction, thereby fluidly coupling the second port to the second workport, and fluidly coupling the first workport to the first port.

9. The valve assembly of claim 8, further comprising:
a first check valve disposed adjacent the first spool; and
a second check valve disposed adjacent the second spool, wherein:
  as fluid is provided to the first port, fluid opens the first check valve to allow fluid flow from the first port to the first workport, while pushing the first spool and the second spool in the first direction, causing the second spool to open the second check valve and allow fluid flow from the second workport to the second port; and
  as fluid is provided to the second port, fluid opens the second check valve to allow fluid flow from the second port to the second workport, while pushing the second spool and the first spool in the second direction, causing the first spool to open the first check valve and allow fluid flow from the first workport to the first port.

10. A hydraulic system comprising:
a hydraulic cylinder actuator having a cylinder and a piston axially movable in the cylinder, wherein the piston has a piston head that divides an internal space of the cylinder into a first chamber and a second chamber;
a fluid reservoir;
a pilot pressure source that generates a pilot fluid signal; and
a valve assembly that controls fluid flow to and from the hydraulic cylinder actuator, wherein the valve assembly has (i) a first workport fluidly coupled to the first chamber, (ii) a second workport fluidly coupled to the second chamber, (iii) a reservoir port fluidly coupled to the fluid reservoir, (iv) a pilot port fluidly coupled to the pilot pressure source to receive the pilot fluid signal, and (v) a first spool and a second spool, wherein the pilot fluid signal actuates the first spool and the second spool to fluidly couple the first workport and the second workport to the reservoir port, thereby operating the piston in a float mode.

11. The hydraulic system of claim 10, wherein the valve assembly further comprises:
a housing including the first workport, the second workport, the reservoir port, and the pilot port, wherein the housing includes a cavity therein, wherein
the first spool is disposed in the cavity of the housing, and
the second spool is disposed in the cavity, wherein the second spool is disposed at least partially within the first spool, wherein movement of the first spool relative to the second spool enables fluidly coupling the first workport and the second workport to the reservoir port.

12. The hydraulic system of claim 11, wherein the valve assembly further comprises:
a central check assembly fixedly disposed within the first spool and the second spool, wherein the pilot fluid signal separates the first spool from the second spool such that the first spool moves in a first direction and the second spool moves in a second direction, opposite the first direction, wherein movement of the first spool and the second spool relative to the central check assembly opens respective fluid paths between the first workport and the reservoir port and between the second workport and the reservoir port.

13. The hydraulic system of claim 12, wherein the valve assembly further comprises:

a first check valve disposed adjacent the first spool; and
a second check valve disposed adjacent the second spool, wherein movement of the first spool causes the first check valve to open and allow fluid flow to and from the first workport, and wherein movement of the second spool causes the second check valve to open and allow fluid flow to and from the second workport.

14. The hydraulic system of claim 10, further comprising:
a pump configured to be a bi-directional fluid flow source driven by an electric motor in opposite rotational directions to provide fluid flow to the first chamber or the second chamber of the hydraulic cylinder actuator to drive the piston, wherein the pilot pressure source: (i) receives fluid from the pump for a particular period of time after which the pump stops, (ii) generates the pilot fluid signal provided to the pilot port of the valve assembly, and (iii) maintains the pilot fluid signal to the pilot port after the particular period of time when the pump stops.

15. The hydraulic system of claim 14, wherein the pilot pressure source comprises:
an electrically-actuated valve that operates in: (i) a first state, wherein the electrically-actuated valve allows fluid received from the pump to flow to the fluid reservoir, and (ii) a second state wherein the electrically-actuated valve blocks fluid received from the pump from flowing to the fluid reservoir, thereby allowing the fluid to flow to the pilot port of the valve assembly.

16. The hydraulic system of claim 14, wherein the pilot pressure source comprises:
a pilot-operated (PO) check valve that allows free flow to the pilot port, while allowing back flow from the pilot port when the PO check valve is actuated; and
an electrically-actuated valve that operates in: (i) a first state, wherein the electrically-actuated valve allows fluid received from the pump to flow to the valve assembly, and (ii) a second state wherein the electrically-actuated valve allows fluid received during the particular period of time to flow through the PO check valve to the pilot port of the valve assembly to activate the float mode.

17. The hydraulic system of claim 16, wherein to deactivate the float mode, the pump provides fluid through the electrically-actuated valve operating in the first state, thereby actuating the PO check valve and allowing back flow from the pilot port to the fluid reservoir.

18. A method comprising:
providing a pilot fluid signal to a pilot port of a valve assembly comprising a first workport fluidly coupled to a first chamber of a hydraulic cylinder actuator, a second workport fluidly coupled to a second chamber of the hydraulic cylinder actuator, and a reservoir port that is fluidly coupled to a fluid reservoir;
responsive to the pilot fluid signal, causing a first spool of the valve assembly to move in a first direction, thereby opening a first check valve and fluidly coupling the first workport of the valve assembly to the reservoir port; and
responsive to the pilot fluid signal, causing a second spool of the valve assembly to move in a second direction, opposite the first direction, thereby opening a second check valve and fluidly coupling the second workport of the valve assembly to the reservoir port.

19. The method of claim 18, wherein the first spool has a protrusion, and wherein the second spool has a respective protrusion, wherein:

19

20 opening the first check valve comprises causing the
protrusion of the first spool to contact a check element
of the first check valve to open the first check valve;
and opening the second check valve comprises causing the
respective protrusion of the second spool to contact a
respective check element of the second check valve to
open the second check valve.

20. The method of claim 18, wherein the valve assembly
further comprises: (i) a first centering spring applying a
biasing force on the first spool toward the second spool, and
(ii) a second centering spring applying a respective biasing
force on the second spool toward the first spool, wherein
causing the first spool to move in the first direction com-
prises moving the first spool against the biasing force of the
first centering spring, wherein causing the second spool to
move in the second direction comprises moving the second
spool against the respective biasing force of the second
centering spring, and wherein the method further comprises:

removing the pilot fluid signal; and causing the first centering spring to return the first spool
to a neutral position, and the second centering spring to
return the second spool to the neutral position, thereby
causing the first check valve to block fluid flow to and
from the first workport, and causing the second check
valve to block fluid flow to and from the second
workport.

* * * * *